INVENTOR.
JOHN G. ATHANASIOU
BY
ATTORNEY

June 10, 1969 J. G. ATHANASIOU 3,448,988
PRECISION TOOLHOLDER
Filed May 31, 1966 Sheet 2 of 2

JOHN G. ATHANASIOU
INVENTOR.

BY
ATTORNEY 3,448,988
PRECISION TOOLHOLDER
John G. Athanasiou, 564 Parkway,
South San Francisco, Calif. 94100
Filed May 31, 1966, Ser. No. 554,053
Int. Cl. B23b 5/22, 5/34, 31/24
U.S. Cl. 279—16
4 Claims

ABSTRACT OF THE DISCLOSURE

A precision tool holder has a body with a hub formed with an internal socket and a shank for attachment to a machine, the hub having a circumferential indicator groove. Fitting in the body is an adapter having a spherical knob and a second shank, the knob having a center point lying in the plane of the middle of the groove, the shank rotatable through 360° relative to the body. The knob has a radial pin in the plane engaging a flat surface in the body so that the body and adapter may drive each other. A retainer threaded into the hub detachably secures the body and adapter together.

---

This invention relates to a new and improved precision tool holder, and is used to compensate for misalignments of the axes of rotation of the workpiece and tool in conventional precision machine tools, such as lathes and turret lathes, milling machines, boring machines and drills. In a preferred form of the invention, hereinafter described in detail, the holder is attached to a stationary portion of the machine and the tool is attached to the holder, and hence also remains stationary, while the workpiece is rotated. However, the reverse relationship may be employed.

Essentially, the present invention comprises a body which is attached to the machine and which has a spheroidal or conical socket, an adapter to which the tool is attached and which has a spherical ball formed thereon which mates with the socket of the body, a retainer to hold the foregoing two parts together and drive pins to drive the body and adapter relative to each other, rather than relying upon friction.

Accordingly, a principal feature of the invention is its simplicity of construction and assembly.

A further feature of the invention is the fact that the axis of the adapter may swivel relative to the axis of the body through 360 degrees without interference. The amplitude of angular movement of the two parts relative to each other is sufficient to accommodate any conventional precision machining operation.

A still further feature of the invention is the provision, on the exterior of the body, of an accurately formed groove to cooperate with a conventional dial indicator to check to determine whether the parts are properly aligned. The groove lies in the plane of, and is concentric with, the center of the spheroidal socket of the adapter, thus insuring the accuracy which has been mentioned. Since the groove is located relative to the center of the sphere, a single check must be made to determine the accuracy of the positioning of the axis of the adapter, and this reduces the amount of time required to perform the checking operation, and also reduces the possibility of error.

A further feature of the invention is the fact that optionally, the machinist may, by loosening the retainer, permit the tool to center itself relative to a pilot hole or relative to the spindle of the machine, and thus remain free floating during the operation. On the other hand, once the tool has centered itself, the retainer may be tightened and the parts locked together.

The floating of the tool relative to the holder is likewise improved in that the driving pins are preferably round and engage flat surfaces of the body so that there is a minimum of friction between the parts. This permits the floating action. It should also be emphasized that the pins lie in the plane of the groove, likewise promoting accuracy in alignment of the parts. Since the driving pins are located in positions such that they are radii from the center of the sphere and lie in the plane of the indicator groove, a uniform and balanced driving action is achieved and there is a minimum of interference with the swiveling action of the adapter. Placement of the pins eliminates leverage and hence there is no tendency to force the tool to an eccentric position.

Because of the construction of the holder, as hereinafter explained, it is not necessary in setting up the job that the center line of the shank of the body lie in the same plane as the spindle axis of the machine and of the workpiece. This permits accurate machining when the groove is accurately aligned with an indicator.

In a preferred form of the invention, once the adapter is tight, the parts are sealed together. In certain machining operations, such as in gun drilling, a drilling compound under high pressure is forced through the tool shank. By reason of the sealing of the parts in the present invention the same high pressure forcing of drilling compound through bores in the parts is possible without, on the other hand, diminishing the floating action or accuracy of the holder.

In a preferred form of the invention, the retainer and body are provided with mating square thread. This permits the retainer to seat and align relative to the sphere of the adapter and the retainer seats in alignment with the body, an advantage of particular benefit when high-pressure drilling compounds are used.

A further advantage of the invention is the fact that the holder may be formed with external and internal configurations so as to accommodate a wide variety of different tools, having tapered shanks or collets or chucks of various types.

At the same time, the body is also capable of being formed with various internal and external configurations to adapt to a variety of machine-holding means.

The retainer may be knurled externally so that it may be manually tightened or loosened. On the other hand, slots may be formed on the exterior of the retainer in order to permit a wrench to be used.

Another advantage of the invention is the fact that the tools may be changed quickly. Thus a drill may be replaced with a reamer without the necessity of rechecking the alignment with an indicator.

In a modification of the invention, the body may be formed of two parts adjustably held together to provide for adjustment of the seat centering relative to the shank center line.

In another modification of the invention, the body socket may be formed conical rather than spheroidal. The adapter then seats in the cone of the body. This modification is particularly useful where a very rigid connection is required. As a further alternate, a change-part adapter may be substituted having a conical part fitting the body cone so that a very rigid connection is provided and does not swivel.

Essentially, the present invention permits a swivel or floating action between the body and adapter with a preset desired resistance to movement of the axes of the two parts relative to each other. The holder comprises a body attached to a machine having a socket, an adapter to which the tool is attached and having a ball which fits the socket and a retainer to hold the parts together. The body has an external indicating groove to check proper alignment of the parts.

Other objects of the present invention will become apparent upon reading the following specification and referring to the accompanying drawings in which similar characters of reference represent corresponding parts in each of the several views.

Figure 2:
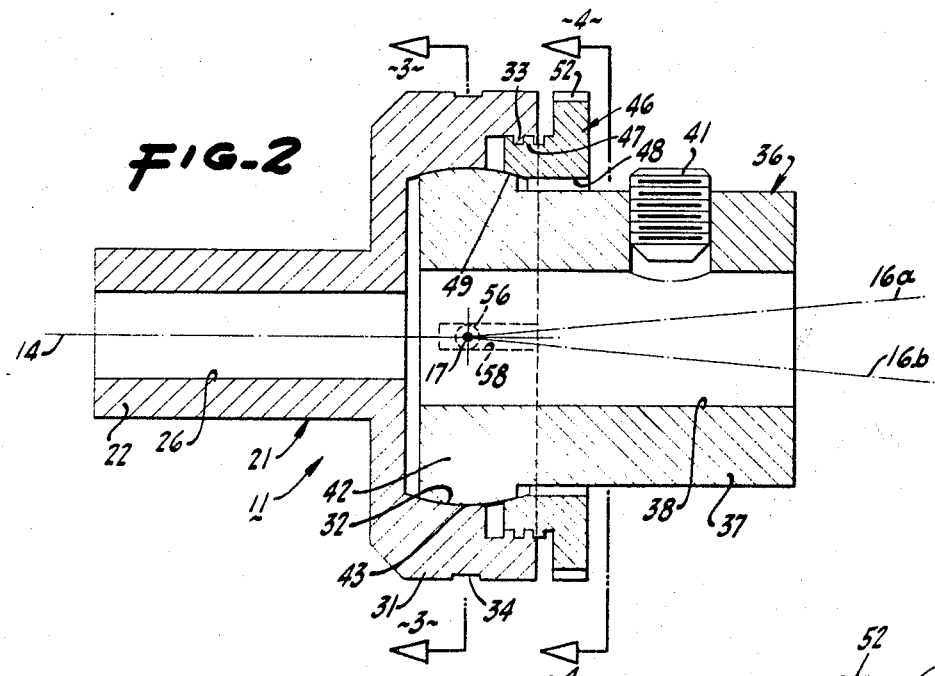
FIG. 2 is an enlarged, vertical, sectional view through the holder.
Figure 3:
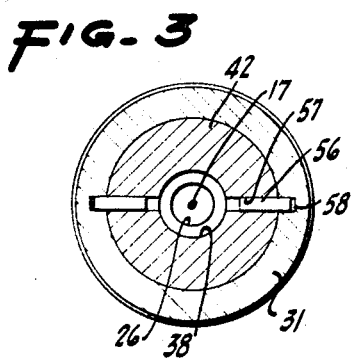
Figure 4:
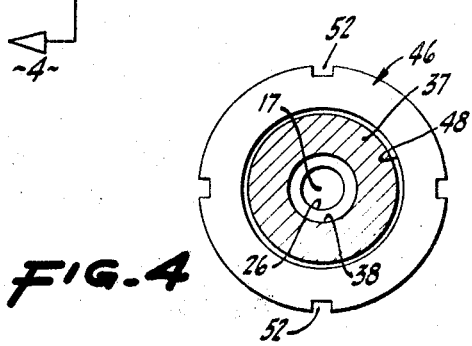

FIGS. 3 and 4 are respectively sections taken along lines 3—3 and 4—4 of FIG. 2.

Figure 5:
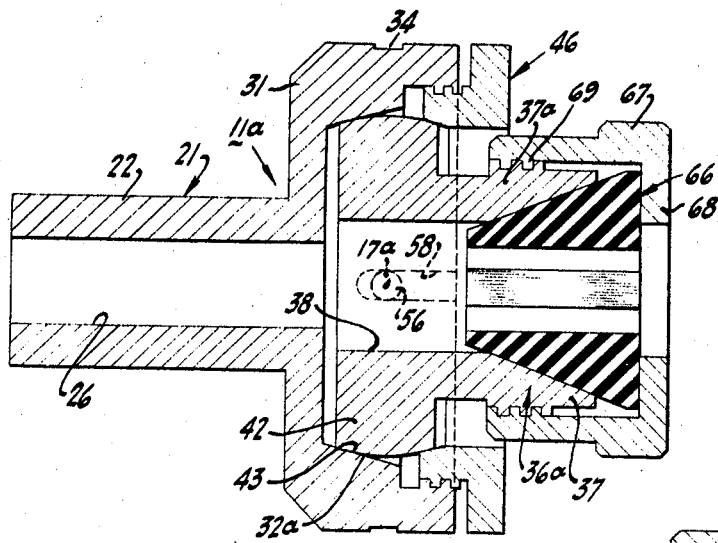

FIG. 5 is a view similar to view of FIG. 2, showing a conical seat in the body and also showing a flexible chuck for attachment to a tool holder.

Figure 6:
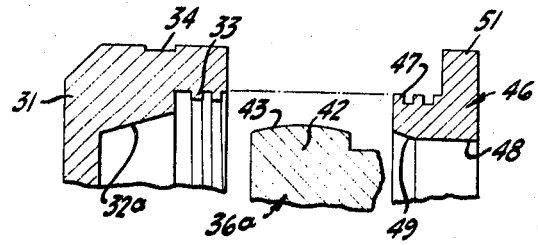

FIG. 6 is an enlarged, exploded, fragmentary view of a portion of the modification of FIG. 5.

Figure 7:
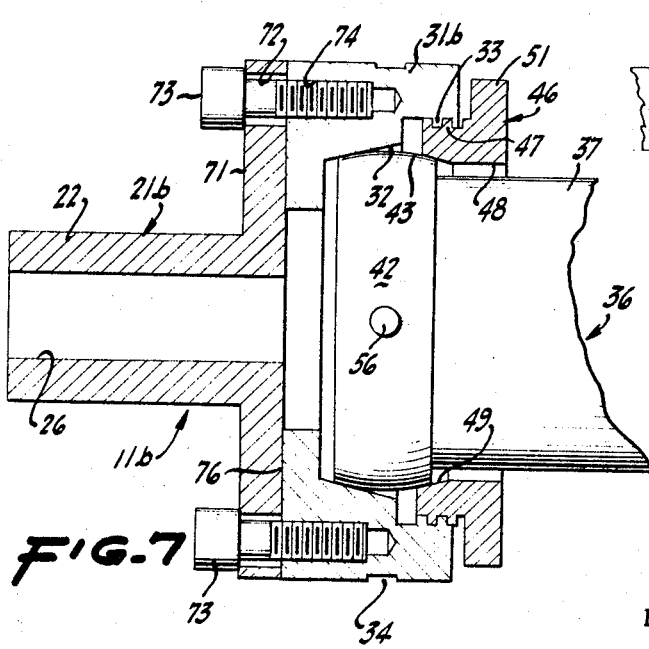

FIG. 7 is a view similar to FIG. 2 of a further modification wherein the body is formed of two parts.

Figure 8:
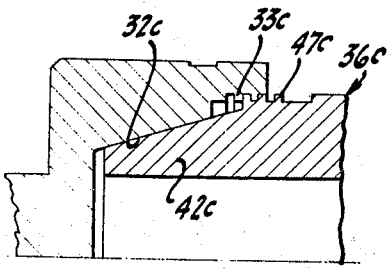

FIG. 8 is a fragmentary view of a modification in which the adapter is formed with a cone fitting the conical socket of the body for a rigid connection of the parts.

Figure 1:
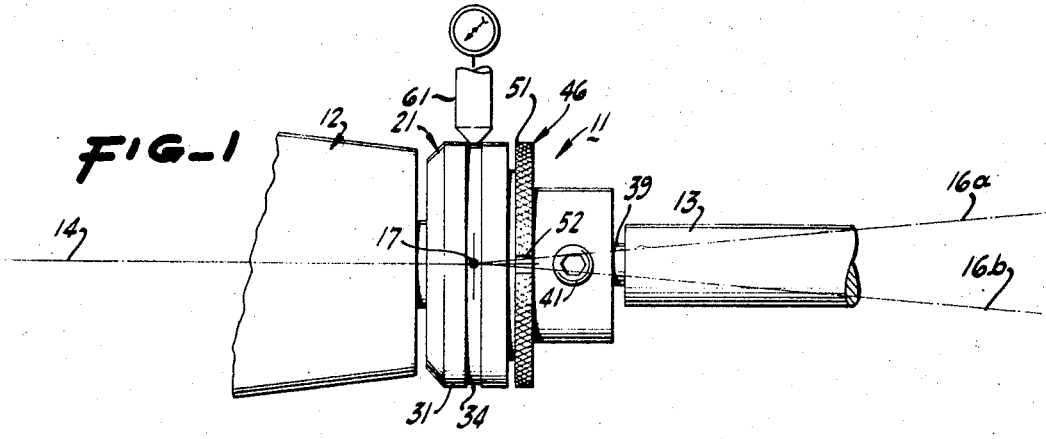
FIG. 1 is a schematic side elevational view of the holder and portions of the associated mechanisms.

As illustrated in FIG. 1, the holder 11, which is the subject of this invention, may be installed in a conventional tool post 12, tail stock of a lathe or similar machine tool stationary member and holds a tool 13, such as a drill. Tool 13 performs its function on a revolving workpiece (not shown). Alternatively, the workpiece may be held stationary and the member 12 suitably turned, as is well understood in this art. In the accompanying drawing, 14 represents the axis of member 12, and 16a and 16b represent extremes to which the axis of tool 13 may be adjusted relative to axis 14, about spheroidal center 17.

Body 21 is one of the members comprising holder 11 and has a shank 22, preferably hollow, which may be gripped by member 12. It will be understood that the bore 26 of shank 22 may be cylindrical as shown, or may be made tapered, or other suitable shape for internal attachment to a member such as 12. At the end of body 21 opposite shank 22 is an enlarged diameter annular hub 31 formed at its inner end with a spheroidal socket 32 and at its other end with an internal, square thread 33. Socket 32 has as its center point 17. Formed in the exterior of hub 31 is an indicator groove 34. Groove 34 lies in a plane, passing through point 17 transverse to the axis of shank 22.

A second part of tool 11 is adapter 36, which also has a shank 37 here shown as hollow and provided with a cylindrical bore 38 for attachment to a portion 39 of tool 13, as by means of a set screw 41. Adapter 36 at its end opposite element 12 has a knob 42 having a spheroidal exterior 43 which mates with spheroidal socket 32.

In order to hold the parts together when they are in adjustment, a retainer 46 may be used. Retainer 46 has an externally square threaded reduced diameter end 47 and a bore 48 sufficiently large as to provide sufficient clearance for the exterior of shank 37 to permit axes 16a and 16b to assume the angularity shown in FIGS. 1 and 2. The inner tip 49 of retainer 46 is also spheroidal to engage knob 42 and force surfaces 43 and 32 into tight engagement. The exterior 51 of retainer 46 may be knurled, as shown in FIG. 1, and 90 degree spaced slots 52 may be formed to permit use of a wrench to tighten the parts together when a firm engagement is required.

As has been stated, in some machining operations it is desirable to force drilling compound through the tool axis. The present invention provides a seal to permit this operation. Thus compound entering along the bore 26 will pass into the bore 38 without leakage by reason of the tight seating of surfaces 32 and 43, once the retainer 46 is tightened.

Preferably the drive between members 21 and 36 is accomplished by means of a plurality of pins 56 projecting radially from holes 57 in knob 42. Flat sided slots 58 are formed in hub 31. Since pins 56 are round and the surfaces of slots 58 which they engage are flat, there is a minimum of friction which prevents interference with the swiveling action. The axes of pins 56 intersect point 17.

In use, shank 22 is suitably attached to machine part 12 and a tool 13 installed in shank 37. Retainer 46 is loosened sufficiently to permit swiveling of parts 21 and 36 relative to each other. A dial indicator 61 may be used in conjunction with groove 34 to accurately align shank 22 relative to part 12 so that a zero reading is obtained on the indicator as hub 31 is slowly revolved. The knob 42 mates firmly with socket 32. When this is achieved, retainer 46 is tightened. Since the plane of groove 34 coincides with center 17, the indicator indicates proper alignment of shank 37 and tool 13. Alternatively, instead of using indicator 61 the tool 13 may be used to center itself, as where there is a pilot hole in the workpiece. When the machine operation commences, parts 21 and 36 do not rotate relative to each other by reason of the engagement of pins 56 with the flat surfaces of slots 58. Where a drilling compound is used it may be forced under pressure through bore 26 and thence into bore 38, the parts sealing together to permit high pressure delivery of the compound.

Turning now to the modification of FIGS. 5 and 6, many of the parts are similar or identical in construction and the same reference numerals are employed. However, the surface 32a is conical rather than spheroidal. As a further modification of FIG. 5, a flexible collet 66 may be used, such as disclosed in Patent No. 2,348,718, held in place by a nut 67 and a flange 68 which engages and retains the collet 66. Nut 67 is formed with threads 69 on its inner end to mate with thread on the shank 37a of adapter 36a.

Directing attention now to FIG. 7, again many of the parts are similar to those of FIGS. 1 to 4, inclusive, and the same reference numerals are employed. The body 21b, however, is formed in two parts in that the shank 22 has a flange 71 formed with oversize holes 72 to receive bolts 73 which screw into tapped holes 74 in hub 31b. Thus shank 21b and hub 31b may be shifted relative to each other to adjust the alignment of center 17 to the axis of the workpiece. Since the parting surface 76 between flange 71 and hub 31b is flat, accurate alignment is possible.

FIG. 8 discloses a modified adapter 36c used with conical socket 32c, similar to that of the modification of FIGS. 5 and 6. In this modification, adapter 36c is a quick-change part to replace adapter 36, or the like, when a rigid connection is desired. End 42c is conical and mates tightly with socket 32c. A separate retainer is not required and hence enlargement 47c is formed integral with cone end 42c and externally threaded to engage threads 33c. Parts corresponding to those of preceding modifications are designated with similar reference numerals.

Although the foregoing invention has been described in some detail, by way of illustration and example for purposes of clarity of understanding, it is understood that certain changes and modifications may be practiced within the spirit of the invention and scope of the appended claims.

What is claimed is:

1. A tool holder comprising a body having a hub formed with an internal socket and a first shank for attachment to a machine part, the exterior of said hub being formed with a circumferential indicator groove, an adapter formed with a spherical knob shaped to fit in said socket and a second shank for attachment to a tool, said second shank rotatable through 360° relative to said body about a center point at the center of said knob, said center point lying in a plane established by the middle of said groove, and a retainer in threaded engagement with said hub and bearing against said knob to secure said body and adapter relative to each other, said knob being formed with at least one radial hole and said hub with a flat surface in alignment with said hole and which further comprises a round pin in said hole projecting beyond said knob and bearing against said flat surface to drive said body and adapter relative to each other, the axis of said pin lying in a plane including said center point.

2. A tool holder according to claim 1 in which said socket is spheroidal, the center of said socket coinciding with said center point.

3. A tool holder according to claim 1 in which said socket is conical, the axis of said socket passing through said center point.

4. A tool holder according to claim 1 in which said body is formed in two pieces, said first shank formed with a flange engaging said hub and shiftable relative thereto and fastening means for securing said flange and hub in adjusted position.

References Cited

UNITED STATES PATENTS

| | | | |
|---|---|---|---|
| 2,010,587 | 8/1935 | Fisher et al. | 279—16 X |
| 2,508,459 | 5/1950 | Hoffsommer | 279—16 |
| 2,532,058 | 11/1950 | Clark | 279—16 |
| 2,778,647 | 1/1957 | Benjamin et al. | 279—16 |
| 3,338,585 | 8/1967 | Poorman | 279—16 |

FOREIGN PATENTS 247,282  12/1947  Switzerland.

LEONIDAS VLACHOS, *Primary Examiner.*

U.S. Cl. X.R.

10—89; 77—60